May 28, 1963  E. H. JERNBERG ETAL  3,091,714
COLLECTOR RING ASSEMBLY WITH FIELD WINDING DISCHARGE AIR GAP
Filed June 8, 1960

INVENTORS
EVERT H. JERNBERG AND
ROGER K. BERGQUIST

ATTORNEY

United States Patent Office 3,091,714
Patented May 28, 1963

3,091,714
COLLECTOR RING ASSEMBLY WITH FIELD
WINDING DISCHARGE AIR GAP
Evert H. Jernberg, St. Paul, and Roger K. Bergquist, Maple Plain, Minn., assignors to Electric Machinery and Manufacturing Company, Minneapolis, Minn., a corporation of Minnesota
Filed June 8, 1960, Ser. No. 34,729
10 Claims. (Cl. 310—232)

In the operation of synchronous motors having collector rings for providing current to the field windings of the motor, it occasionally happens that the field winding circuit becomes opened. When this occurs, high voltages are developed in the field windings which would cause damage to the field windings. To overcome this condition, electrodes have been connected to the collector rings of the motor arranged to provide a spark gap therebetween forming a discharge path for the currents produced by these voltages. These electrodes must be quite closely spaced and where the motor is used in an atmosphere in which there is free conducting material, such as in a rubber mill, shorts develop across the spark gaps to the detriment of the machine. An object of the invention resides in providing a collector ring assembly, which overcomes the disadvantage of the construction described.

Another object of the invention resides in providing a collector ring assembly, utilizing a spark gap in which the spark gap is completely enclosed and isolated from the air surrounding the machine.

A still further object of the invention resides in utilizing electrodes arranged coaxially, with the spark gap disposed between the ends of the same and in providing a sleeve of heat resisting, insulating material enveloping the ends of the electrodes and forming a chamber in which the spark gap is disposed.

Another object of the invention resides in constructing the sleeve of ceramic material or some other suitable heat-resisting material.

An object of the invention resides in providing a plastic material embedding said sleeve and covering the end surfaces of said rings to reduce the possibilities of flash over between rings.

A still further object of the invention resides in providing an annular barrier embedded in the plastic material between said rings to increase the distance between rings.

Other objects of the invention reside in the novel combination and arrangement of parts in the details of construction hereinafter illustrated and/or described.

Figure 4:
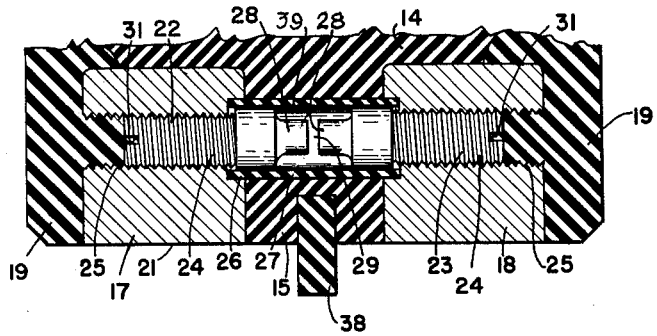
FIG. 4 is a detail view similar to FIG. 1 of a portion of the structure shown therein and drawn to a greater scale.
Figure 2:
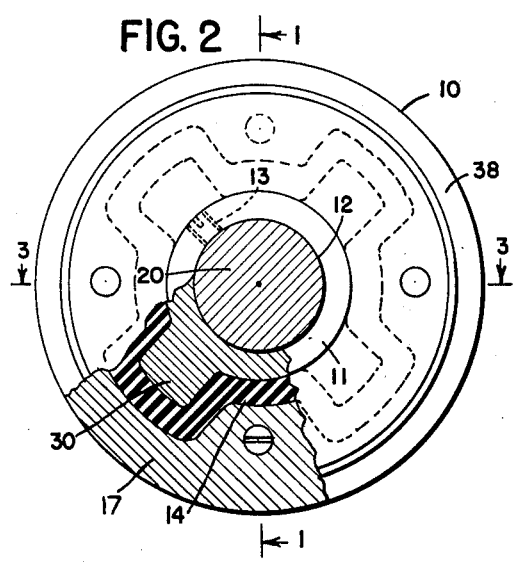
FIG. 2 is a cross sectional view taken on line 2—2 of FIG. 1.
Figure 1:
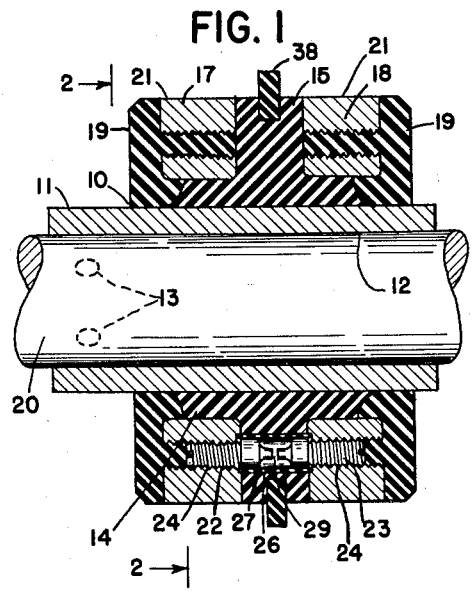
FIG. 1 is a longitudinal, sectional view of a collector ring assembly, illustrating an embodiment of the invention, and taken on line 1—1 of FIG. 2.
Figure 3:
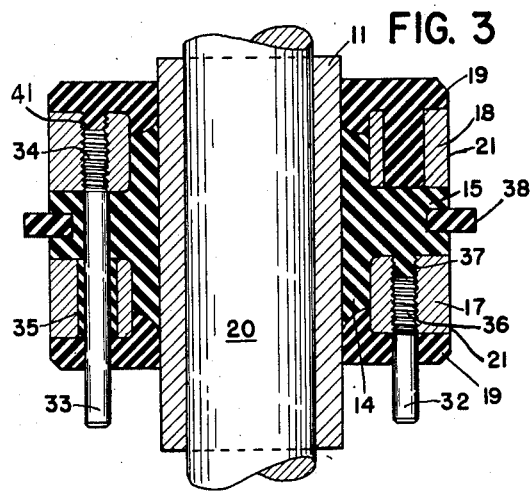
FIG. 3 is a longitudinal sectional view taken on line 3—3 of FIG. 2.

To illustrate the invention, a collector ring assembly has been shown in the drawings which is indicated in its entirety by the reference number 10. This ring assembly includes a bushing 11, which is provided with a bore 12 to receive the shaft 20 on which the collector ring assembly is to be mounted. Set screws 13 in said bushing 11 serve to secure the bushing to the shaft. The bushing 11 is formed with keys 30 and has mounted on and secured to it, an annulus 14, constructed of insulating material and which is formed with an annular raised portion 15 at the center of the same. Mounted on the annulus 14, and on each side of the raised portion 14, are collector rings 17 and 18, constructed of a copper alloy or some other suitable current-conducting material. End flanges 19, extending about the rings 17 and 18, enclose said rings except for the outer contact surfaces 21 thereof. A barrier 38 is mounted in the raised portion 15 and projects outwardly thereof to reduce the sparking from one ring to the other.

The invention proper consists of two electrodes 22 and 23 best shown in FIG. 4. These electrodes are in the form of screws and have threaded portions 24, which are screwed into tapped holes 25 in the rings 17 and 18. These electrodes are coaxially disposed and are received in a chamber 39 within a sleeve 26 mounted in a longitudinal bore 27 in the raised portion 15 of the annulus 14. This sleeve may be constructed of ceramic material or some other heat-resistant, insulating material. The electrodes 22 and 23 are constructed with discharge tips 28 which are spaced from one another to form a spark gap 29 therebetween. The electrodes 22 and 23 have screw driver slots 31 in the ends thereof and by means of which the same may be adjusted to give the desired length of spark gap.

Connections to the rings 17 and 18 are made through lead studs 32 and 33. Lead stud 32 extends through the flange 19 adjoining ring 17 and has a threaded end 36 which is screwed into threads 37 formed in the ring 17. Lead stud 33 extends through a sleeve 35, disposed in ring 17, and through the raised portion 15. This stud is constructed with a threaded end 34 screwed into threads 41 formed in the ring 18. By means of this construction, separate connections may be made to the 2 rings which are connected to the windings of the rotor of the motor.

In the manufacture of the device, the rings 17 and 18 with studs 32 and 33 and the electrodes 22 and 23 attached and the sleeve 26 encircling said electrodes, are mounted in a suitable jig and barrier 38 is also mounted in said jig and a plastic insulating material poured in and about said parts to form the annulus 14. Adjustment of the spark gap 29 is then made and die members placed at the ends of the rings and encircling the bushing 11. Plastic insulating material is then poured about the bushing 11 and adjacent the ends of the rings to form the end flanges 19.

The mode of operation of the invention is as follows: When, for any reason, the field windings circuit becomes open, high voltages are developed in the field windings. When these voltages reach a high-enough value, which would cause damage to the field windings, the same are discharged through the spark gap 29 and the windings are protected from injury. Due to the construction, by means of which the discharge tips 28 and spark gap 29 are enclosed within the sleeve 26, foreign matter which may be present in the air in which the machine is operated is prevented from shorting the two electrodes which would render them ineffective.

The advantages of the invention are manifest. An electric machine equipped with this invention can be used in any type of atmosphere and still maintain adequate protection for the field windings. The invention can be constructed at a nominal expense. Once the invention has been installed, the machine will need no further attention and will always be available for use when required.

Changes in the specific form of the invention, as herein described, may be made within the scope of what is claimed without departing from the spirit of the invention.

Having described the invention what is claimed as new and desired to be protected by Letters Patent is:

1. In a collector ring assembly for rotating electrical machines having an annulus of insulating material, juxtaposed spaced collector rings mounted on said annulus and electrodes attached to said rings and having closely spaced discharge tips forming therebetween a spark gap, the combination of open ended, preformed insulating means enclosing said tips and air gap and isolating said spark gap from the air surrounding said machine.

2. In a collector ring assembly for rotating electrical machines having an annulus of insulating material, juxtaposed spaced collector rings mounted on said annulus and aligning electrodes attached to said rings and having facing closely spaced discharge tips forming therebetween a spark gap, the combination of a sleeve of insulating material encircling the protruding ends of said electrodes and said spark gap and extending up to said rings, said sleeve isolating said spark from the air surrounding said machines.

3. In a collector ring assembly for rotating electrical machines having an annulus of insulating material, juxtaposed spaced collector rings mounted on said annulus, aligning screws screwed into said collector rings and serving as electrodes said screws having ends extending beyond the rings and closely spaced discharge tips at the ends of said screws forming therebetween a spark gap, the combination of a tubular sleeve extending about the ends of said screws and fitted thereto to form a discharge chamber containing said spark gap, isolated from the air surrounding said machine.

4. In a collector ring assembly for rotating electrical machines having an annulus of insulating material, juxtaposed spaced collector rings mounted on said annulus, aligning screws screwed into said collector rings and serving as electrodes said screws having ends extending beyond the rings and closely spaced discharge tips at the ends of said screws forming therebetween a spark gap, the combination of a tubular sleeve extending about the ends of said screws and fitted thereto to form a discharge chamber containing said spark gap isolated from the air surrounding said machine and insulating means surrounding the sleeve and extending up to said rings and closing the space between said rings.

5. In a collector ring assembly for rotating electrical machines having an annulus of insulating material, juxtaposed spaced collector rings mounted on said annulus, aligning screws screwed into said collector rings and serving as electrodes, said screws having ends extending beyond the rings and closely spaced discharge tips at the end of said screws forming therebetween a spark gap, the combination of a tubular sleeve extending about the ends of said screws and fitted thereto to form a discharge chamber containing said spark gap isolated from the air surrounding said machine and insulating means surrounding the sleeve and extending up to said rings and closing the space between said rings, said insulating means including an annular barrier disposed between said rings and extending outwardly therefrom.

6. In a collector ring assembly for rotating electrical machines having an annulus of insulating material, juxtaposed spaced collector rings mounted on said annulus, aligning screws screwed into said collector rings and serving as electrodes said screws having ends extending beyond the rings and closely spaced discharge tips at the ends of said screws forming therebetween a spark gap, the combination of a tubular sleeve extending about the ends of said screws and fitted thereto to form a discharge chamber containing said spark gap, isolated from the air surrounding said machine and insulating means including an annular barrier disposed between said rings and extending outwardly therefrom.

7. In a collector ring assembly for rotating electrical machines having an annulus of insulating material, juxtaposed spaced collector rings mounted on said annulus, aligning screws screwed into said collector rings and serving as electrodes, said screws having ends extending beyond the rings and closely spaced discharge tips at the ends of said screws forming therebetween a spark gap, the combination of a tubular sleeve extending about the ends of said screws and fitted thereto to form a discharge chamber containing said spark gap, isolated from the air surrounding said machine, plastic insulating means surrounding the sleeve and extending from ring to ring and closing the space between said rings and plastic means extending outwardly beyond the outer surfaces of said rings.

8. In a collector ring assembly for rotating electrical machines, an annulus of insulating material, juxtaposed spaced collector rings mounted on said annulus, aligning screws having their axes parallel to the axis of said annulus and extending through the rings on both sides thereof, said screws serving as electrodes and having ends extending beyond said rings and closely spaced discharge tips at the ends of said screws forming therebetween a spark gap, the combination of insulating means surrounding the sleeve and extending from ring to ring and enclosing said tips and air gap and isolating said air gap from the air surrounding said machine and other insulating means enclosing the other ends of said screws and extending up to the outer surfaces of said rings.

9. In a collector ring assembly for rotating electrical machines, an annulus of insulating material, juxtaposed spaced collector rings mounted on said annulus, aligning electrodes attached to said rings and having facing closely spaced discharge tips forming therebetween a spark gap, the combination of a sleeve constructed of a ceramic material and encircling the protruding ends of said electrodes and said spark gap and isolating said spark from the air surrounding said machine.

10. In a collector ring assembly for rotating electrical machines having an annulus of insulating material, juxtaposed spaced collector rings with tapped holes mounted on said annulus, aligning screws screwed into the tapped holes of said collector rings and serving as electrodes, said screws having ends extending beyond the rings and closely spaced discharge tips at the ends of said screws forming therebetween a spark gap, the combination of facing sockets formed in said rings and extending about the ends of said tapped holes and a tubular sleeve extending about the ends of said screws and received in said sockets to form a discharge chamber containing said spark gap, isolated from the air surrounding said machine.

References Cited in the file of this patent

UNITED STATES PATENTS 1,966,077    Nyman _____ July 10, 1934

FOREIGN PATENTS 1,032,546    France _____ Mar. 25, 1953